United States Patent [19]

Lass

[11] 4,361,302
[45] Nov. 30, 1982

[54] CABLE CLAMP FOR ELECTRICAL OUTLET BOX

[75] Inventor: John L. Lass, Homewood, Ill.

[73] Assignee: Square D Company, Palatine, Ill.

[21] Appl. No.: 188,445

[22] Filed: Sep. 19, 1980

[51] Int. Cl.³ .............................................. F16L 5/00
[52] U.S. Cl. .................................. 248/56; 174/65 G;
174/153 G
[58] Field of Search .............................. 248/56, 74 R;
174/153 G, 65 G; 339/103 R, 103 B, 103 C

[56] References Cited

U.S. PATENT DOCUMENTS

| 2,225,472 | 12/1940 | Franklin | 174/153 G |
| 2,902,536 | 9/1959 | Huth | 174/153 G |
| 3,221,572 | 12/1965 | Swick | 248/56 |

FOREIGN PATENT DOCUMENTS

| 522175 | 9/1953 | Belgium | 174/65 G |
| 1414453 | 12/1963 | France | 174/65 G |
| 262532 | 12/1926 | United Kingdom | 174/65 G |

Primary Examiner—William H. Schultz
Assistant Examiner—Ramon O. Ramirez
Attorney, Agent, or Firm—Stephen A. Litchfield; Carmen B. Patti; Richard T. Guttman

[57] ABSTRACT

This disclosure depicts a novel cable clamp for use with a non-metallic electrical outlet box having rectangular apertures in the walls thereof and for securing a non-metallic sheathed electrical cable to the electrical outlet box. The cable clamp comprises a substantially U-shaped base which is slightly larger than the rectangular aperture in the wall of the electrical outlet box and first and second claw members attached on opposite sides of the base for securing the electrical cable after the cable clamp is positioned on the electrical cable and one of the claw members is inserted through the rectangular aperture in the wall of the electrical outlet box. The cable clamp securely holds the cable in position when either pushing or pulling tension is applied to the cable.

6 Claims, 5 Drawing Figures

CABLE CLAMP FOR ELECTRICAL OUTLET BOX

CROSS-REFERENCE TO RELATED APPLICATIONS

This application relates to, but is no way dependent upon, copending applications of common ownership herewith, including: Ser. No. 68,315 U.S. Pat. No. 4,223,178 filed Aug. 20, 1979, Ser. No. 81,944 U.S. Pat. No. 4,288,655 filed Oct. 4, 1979 and Ser. No. 170,306 filed July 18, 1980.

BACKGROUND OF THE INVENTION AND PRIOR ART STATEMENT

The present invention relates generally to electrical outlet boxes adapted to have electrical devices supported therein and attached to a cable extending through an opening in a wall of the outlet box, and more specifically to a cable clamp for securing the cable within the box.

Heretofore, cable connectors for supporting cables in components such as outlet boxes consisted primarily of a metal collar which had a peripheral thread and utilized a nut received on the thread to connect the collar into an outlet box. Subsequently a second clamping means usually grasped the cable and cooperated with the threaded collar to retain the cable within the outlet box. Not only is such an arrangement costly in terms of manufacturing several parts, there is a tremendous labor cost of inserting the various parts in appropriate sequence within the electrical box.

Another type of cable connector is a non-metallic bushing having a strain relief feature. These devices typically are inserted into the opening in the outlet box and incorporate a retaining means to prevent removal from the box. The cable is held in a position external from the box by the retaining means on the connector.

FIG. 1 of U.S. Pat. No. 3,701,505 shows a typical non-metallic bushing having a retaining means. The bushing is made to snap into the opening in the electrical outlet box and is retained in the opening by a number of spring like fingers. The retaining means for the electrical cable is external to the electrical outlet box and comprises a clamping mechanism which is operated by two screws.

FIGS. 9 and 10 of U.S. Pat. No. 3,493,205 shows another example of a non-metallic bushing with a retaining means. This device uses a pawl means to engage the ratchet teeth of a plug member which traps the electrical cable. The bushing is snapped into the hole in the electrical outlet box.

U.S. Pat. No. 3,701,505 and U.S. Pat. No. 3,493,205 are in the opinion of applicant the closest prior art of which applicant is aware, but applicant does not represent that a search has been made or that no better art exists. A concise explanation of the relevance of each item has been given above and a copy of each item is being submitted with this specification. The relevance of the prior art indicated should not be given a limited interpretation. A cited prior art item may be found to have relevance in a passage other than the one referred to, or to have relevance in a sense different than as stated.

OBJECTS OF THE INVENTION

It is a general object of the present invention to provide a cable clamp for securing an electrical cable in an electrical outlet box.

It is another object of the present invention to provide a cable clamp capable of being molded from non-metallic materials.

It is another object to provide a cable clamp which secures the cable when either pushing or pulling forces are applied to the cable.

It is another object to provide a cable clamp which is easy and inexpensive to manufacture.

It is yet another object to provide a cable clamp which requires a minimum amount of time for installation in the electrical outlet box and a minimum amount of time for installation of the electrical cable.

A further object of the present invention is to provide a cable clamp which can be used with non-metallic boxes having different size openings.

BRIEF DESCRIPTION OF THE DRAWINGS

Features of the present invention which are believed to be novel are set forth with particularity in the appended claims. The invention together with objects and advantages may best be understood by reference to the following description taken in conjunction with the accompanying drawings, in the several figures of which like reference numerals identify like elements, and in which:

DESCRIPTION OF THE PREFERRED EMBODIMENT

This invention pertains to a novel apparatus for securing an electrical cable in an electrical outlet box having one or more rectangular openings in the walls of the electrical outlet box. The novel apparatus, referred to as a cable clamp, is inexpensive and efficient to manufacture and requires a minimal amount of time to assemble with the electrical outlet box and the electrical cable. Due to the high cost of materials and labor the electrical industry has sought a solution to the problem of expensive and time consuming connectors which are presently being used for connecting electrical cables to electrical outlet boxes. This novel invention fulfills these requirements.

The novel invention is utilized with non-metallic electrical outlet boxes which are well known in the art. These boxes typically have rectangular openings in the walls of the box. The industry has standardized on two different size openings or apertures in the walls of the box. They are substantially rectangular in shape and have dimensions of either 0.5" in height by 0.6" in width or 0.6" in height by 0.5" in width.

The preferred embodiment of the present invention is used with a 10-2, 12-2, or 14-2 width ground wire, AWG non-metallic sheathed cable which is well known in the art.

The present invention will now be described. In general terms this invention involves a cable clamp for use with a non-metallic electrical outlet box having rectangular apertures on walls thereof and for securing a non-metallic sheathed electrical cable to the electrical junction box. The cable clamp comprises a substantially U-shaped base which is slightly larger than the rectangular aperture in the wall of the electrical outlet box. The cable clamp further comprises first and second claw members attached on opposite sides of the base for securing the electrical cable after the cable clamp is positioned on the electrical cable and one of the claw members is inserted through the rectangular aperture in the wall of the electrical junction box. The claw member which is inside of the electrical junction box digs into the electrical cable when a tension attempting to pull the cable out of the electrical outlet box is applied to the cable. Similarly the claw member outside of the electrical junction box digs into the cable when a tension is applied to the cable attempting to force the cable into the electrical junction box. The cable clamp securely holds the cable in position when either a pushing or pulling tension is applied to the cable. The first claw member may be of a different size than the second claw member so that the cable clamp may be utilized with two different sized rectangular apertures.

Figure 1:
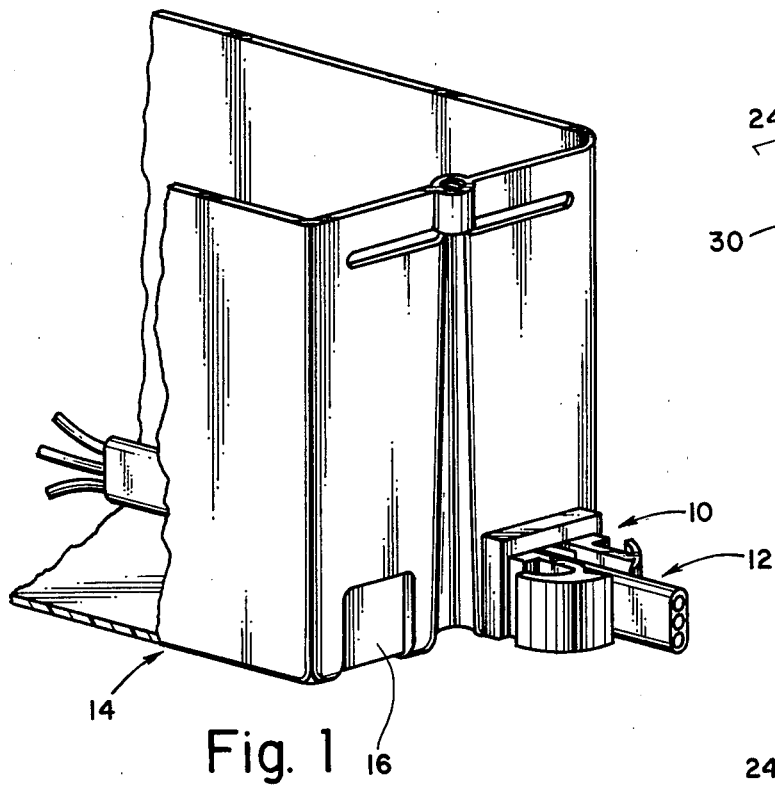
FIG. 1 is a perspective view of the novel cable clamp positioned in an electrical outlet box and securing an electrical cable.
Figure 2:
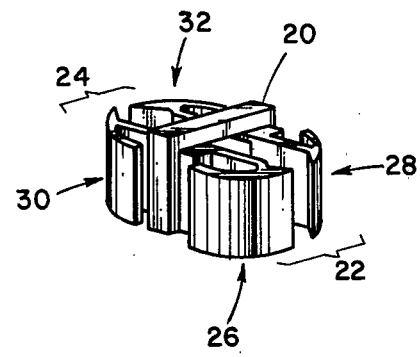
FIGS. 2 and 3 are perspective views of the cable clamp.
Figure 3:
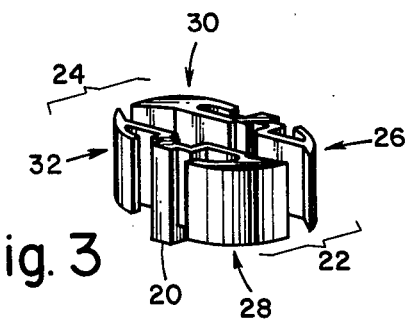

The present invention will now be described in detail. FIG. 1 shows the novel cable clamp 10 securing a non-metallic sheathed electrical cable 12 to an electrical outlet box 14. The non-metallic electrical outlet box 14 has one or more rectangular apertures 16 in the wall 18 of the electrical outlet box 14. The cable clamp 10 is first placed over the cable 12 and then snapped into the aperture 16. The cable clamp 10 secures the cable 12 and prevents movement of the cable 12. A cable clamp may be used in each of the apertures in the electrical outlet box. Also the cable can be released from the cable clamp and the clamp can be reused again at a later time.

Referring to FIGS. 2, 3, 4, and 5, cable clamp 10 comprises first a substantially rectangular U-shaped base 20 which is slightly larger than the rectangular aperture 16 in the wall 18 of the electrical outlet box 14. Different sized first and second claw members 22 and 24 are attached on opposite sides of the U-shaped base 20. Each of the claw members 22 and 24 have first and second clamp sections 26, 28, 30 and 32. The first and second clamp sections 26 and 28 are spaced a predetermined distance apart. Similarly the first and second clamp sections 30 and 32 are also spaced a predetermined distance apart. Each of the clamp sections has; a positioning block 34 which fits inside the rectangular aperture 16 in the wall 18 of the electrical outlet box 14, the height of the positioning block 34 is substantially the same as the height of the aperture 16, a flexible section 36 having a first end 38 attached to the inside edge 40 of the positioning block 34, a cable retainer 42 attached to a second end 44 of the flexible section 36, and a holding portion 46 having a first end 48 attached to the second end 34 of the flexible section 36 and also attached to the cable retainer 42, the holding portion 46 also having a second end 50 which contacts the wall 18 of the electrical outlet box 14 when the cable clamp 10 is inserted in the rectangular aperture 16.

Figure 5:
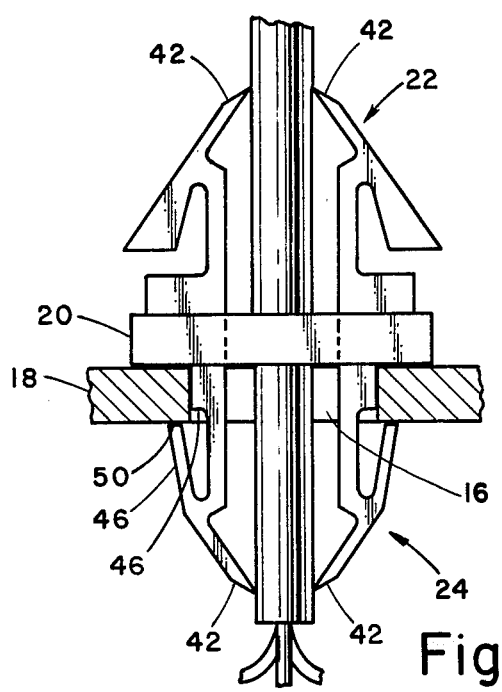
FIG. 5 is a top view of the cable clamp installed in the electrical outlet box with the electrical cable.
Figure 4:
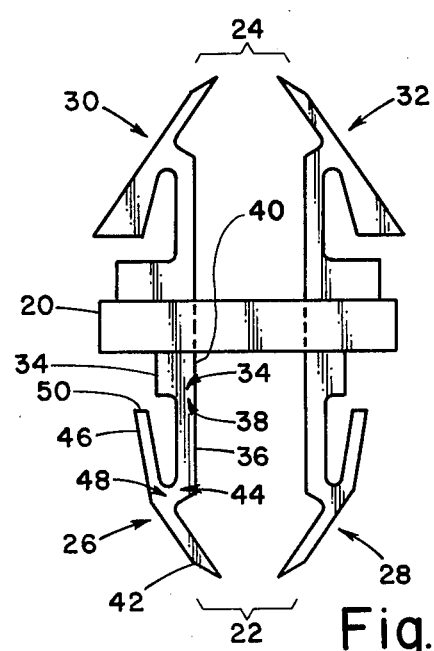
FIG. 4 is a top view of the cable clamp before insertion into the electrical outlet box and before insertion of the electrical cable.

FIG. 5 illustrates in a top view how the cable clamp 10 secures the cable 12. Both claw members 22 and 24 grip the cable 12 with the cable retainers 42. The cable clamp 10 is secured to the electrical outlet box wall 18 as follows; the U-shaped base 20 contacts one side of the wall 18, the positioning block 34 contacts the edge of the wall 18 and the second end of the holding portion 46 contacts the side of the wall 18 opposite the U-shaped base 20. The cable clamp 10 may be inserted either from the inside or outside of the electrical outlet box 14.

The critical dimensions for the cable clamp 10 are the length and spacing of the positioning blocks 34 as these define the aperture size in the wall 18 of the electrical outlet box 14. The length of the positioning block 34 corresponds to the height of the aperture 16 and the spacing of the positioning blocks 34 for one of the claw members would define the width of the aperture 16. Therefore, once the cable clamp 10 is assembled with the electrical outlet box 14, it would fit snuggly in the aperture 16 preventing any excessive movement of the cable clamp 10 in relation to the electrical outlet box 14. In the preferred embodiment the cable retainers which grip the cable are spaced 0.070" apart. The flexible sections 36 are spaced far enough apart to easily clear the width of the cable 12. The cable clamp 10 may be injection molded out of a non-metallic material such as Dupont, Nylon, Zytel #101 or other suitable materials.

The invention is not limited to the particular details of the method depicted and other modifications and applications are contemplated. Certain other changes may be made in the above-described method without departing from the true spirit and scope of the invention herein involved. It is intended therefore that the subject matter of the above depiction shall be interpreted as illustrative and not in a limiting sense.

The invention is claimed as follows:

1. A cable clamp for use with a non-metallic electrical outlet box having rectangular apertures in the walls thereof and for securing a non-metallic sheathed electrical cable to the electrical outlet box, said cable clamp comprising:
   a substantially U-shaped base which is slightly larger than the rectangular aperture in the wall of the electrical outlet box; and
   first and second claw members, each having a different size so that said cable clamp may be utilized with two different sized rectangular apertures in the non-metallic electrical outlet box and attached on opposite sides of said base for securing the electrical cable after said cable clamp is positioned on the electrical cable and one of said claw members is inserted through the rectangular aperture in the wall of the electrical outlet box;
   wherein said claw member which is inside of the electrical outlet box digs into the electrical cable when a tension attempting to pull the cable out of the electrical outlet box is applied to the cable and also wherein the claw member outside of the electrical outlet box digs into the cable when a tension is applied to the cable attempting to force the cable into the electrical outlet box, thereby said cable clamp securely holds the cable in position when either a pushing or pulling tension is applied to the cable.

2. A cable clamp for use with non-metallic electrical outlet boxes having rectangular apertures in the wall thereof and for securing a non-metallic sheathed electrical cable to the electrical outlet box, said cable clamp comprising:
   a substantially U-shaped base which is slightly larger than the rectangular aperture in the wall of the electrical outlet box;

first and second claw members, each having a different size for use with different sized rectangular apertures in the non-metallic electrical outlet boxes and attached on opposite sides of said U-shaped base for securing the electrical cable, said first and second claw members each having first and second clamp sections;

said first and second clamp sections being spaced a predetermined distance apart and each having, a positioning block which fits inside the rectangular aperture in the wall of the electrical outlet box, a flexible section having a first end attached to the inside edge of said positioning block, a cable retainer attached to a second end of said flexible section for contacting the electrical cable, and a holding portion having a first end attached to said second end of said flexible section and to said cable retainer, said holding portion also having a second end which contacts the wall of the electrical outlet box when said cable clamp is inserted in said rectangular aperture, wherein said claw member which is inside of the electrical outlet box digs into the electrical cable when a tension attempting to pull the cable out of the electrical outlet box is applied to the cable and also wherein the claw member outside of the electrical outlet box digs into the cable when a tension is applied to the cable attempting to force the cable into the electrical outlet box, thereby said cable clamp securely holds the cable in position when either a pushing or pulling tension is applied to the cable.

3. The device defined in claim 2, wherein one of said claw members fits a standard size rectangular aperture with a height of 0.5" and a width of 0.6" and said other claw member fits a different standard size aperture with a height of 0.6" and a width of 0.5" and also wherein the size of said claw member is defined by the length of said positioning blocks and the separation distance of said positioning blocks.

4. The device defined in claim 2, wherein the cable clamp is formed of a molded thermal plastic material.

5. The device defined in claim 4, wherein one of said claw members fits a standard size rectangular aperture with a height of 0.5" and a width of 0.6" and said other claw member fits a different standard size aperture with a height of 0.6" and a width of 0.5" and also wherein the size of said claw member is defined by the length of said positioning blocks and the separation distance of said positioning blocks.

6. A non-metallic cable clamp for use with non-metallic electrical outlet boxes having rectangular apertures in the wall thereof and for securing a non-metallic sheathed electrical cable to the electrical outlet box, said cable clamp comprising:

a substantially rectangular U-shaped base which is slightly larger than the rectangular aperture in the wall of the electrical outlet box;

different size first and second claw members attached on opposite sides of said U-shaped base for securing the electrical cable, said first and second claw members each having first and second clamp sections;

said first and second clamp sections being spaced a predetermined distance apart and each having, a positioning block which fits inside the rectangular aperture in the wall of the electrical outlet box, the height of said positioning block being substantially the same as the height of the aperture in the wall of the outlet box, a flexible section having a first end attached to the inside edge of said positioning block, a cable retainer attached to a second end of said flexible section for contacting the electrical cable, and a holding portion having a first end attached to said second end of said flexible section and to said cable retainer, said holding portion also having a second end which contacts the wall of the electrical outlet box when said cable clamp is inserted in said rectangular aperture, wherein said claw member which is inside of the electrical outlet box digs into the electrical cable when a tension attempting to pull the cable out of the electrical outlet box is applied to the cable and also wherein the claw member outside of the electrical outlet box digs into the cable when a tension is applied to the cable attempting to force the cable into the electrical outlet box, thereby said cable clamp securely holds the cable in position when either a pushing or pulling tension is applied to the cable.

* * * * *